United States Patent [19]
McCanna et al.

[11] Patent Number: 6,131,531
[45] Date of Patent: Oct. 17, 2000

[54] BUOYANCY SYSTEM FOR APPLICATION TO SUBMERSIBLE BODIES

[76] Inventors: Jason McCanna, 3030 Elmside Dr., #154, Houston, Tex. 77042; Graeme J. Rae, 306 Beau Jean Ave., Melbourne Beach, Fla. 32951

[21] Appl. No.: 09/158,810

[22] Filed: Sep. 22, 1998

[51] Int. Cl.[7] .................................................. B63G 8/14

[52] U.S. Cl. ............................................................ 114/331

[58] Field of Search ..................................... 114/312, 313, 114/330, 331, 121, 122, 125; 441/136

[56] References Cited

U.S. PATENT DOCUMENTS

| | | | |
|---|---|---|---|
| 3,952,349 | 4/1976 | Erath et al. | 114/331 |
| 4,183,316 | 1/1980 | Bennett | 114/331 |
| 4,364,325 | 12/1982 | Bowditch | 114/331 |
| 4,677,931 | 7/1987 | Buckle | 114/331 |

*Primary Examiner*—Stephen Avila
*Attorney, Agent, or Firm*—Sankey & Luck, L.L.P.

[57] ABSTRACT

The present invention generally relates to apparatus and methods for buoyancy compensation. More particularly, the present invention is directed to a selectively deformable buoyancy device and method for its use.

25 Claims, 6 Drawing Sheets

LEGEND:
No.1 NiTi ALLOY WITH 240 MPa RECOVERY STRENGTH
No.2 NiTi ALLOY WITH 344 MPa RECOVERY STRENGTH
No.3 NiTi ALLOY WITH 688 MPa RECOVERY STRENGTH

BUOYANCY SYSTEM FOR APPLICATION TO SUBMERSIBLE BODIES

BACKGROUND OF THE INVENTION

1. Field of the Invention

The present invention generally relates to apparatus and methods for buoyancy compensation. More particularly, the present invention is directed to a selectively deformable buoyancy device and methods for its use.

2. Description of the Prior Art

Manned and unmanned vehicles used underwater often operate in or near the condition of neutral buoyancy. This condition allows precise, stable control of depth with minimum energy expenditures, especially when working in confined areas. Buoyancy is the upward force on any submerged body which is equal to the weight of water that would otherwise occupy the same volume. Since most components of a subsea vehicle weigh more than their volume of water, additional buoyant volume must be added to the vehicle to achieve a net neutral buoyancy.

Static buoyant volume includes hollow pressure vessels or syntactic foam, and cannot be altered during a dive. In contrast, dynamic buoyancy does allow some means to change the net displacement during a dive. It is chiefly used when vehicles are subject—by accident or design—to varying weights, volumes, or water densities in the midst of their dive. Most variance typically comes from changes to the content or position of onboard equipment caused by the execution of mission activities. However, all vehicles possess a degree of buoyancy instability because all materials compress and expand to some extent in response to changes of pressure and depth. This may also require small adjustments to displacement. A third use for dynamic buoyancy is adjusting the amount of traction a crawling vehicle can apply to the sea floor. Dynamic buoyancy can also be used as the propulsive force in an underwater glider.

In the first three applications, similar adjustments may be made with thrusters or lift from flow over control surfaces. But the latter requires a high velocity relative to the surrounding water which is impractical in many situations. And both require expending additional thruster power, which amount may be excessive or cause an undesired disturbance. Typical dynamic buoyancy systems are floodable "ballast" tanks that can be variably emptied or filled of the surrounding water by some combination of pumps and/or high pressure air. Alternatives include handling systems for oil and expendable weights. This equipment can be bulky and heavy in itself, and the effectiveness of gas-based systems drops off rapidly with the higher pressures experienced at more than 100 meters depth below the sea surface. Furthermore, such equipment can be difficult to miniaturize. A dynamic buoyancy system may in itself be heavier than the water and require a dedicated volume of state buoyancy to cancel most of its weight. Accelerations and attitude changes by the vehicle can move the parcels of water and air in the "ballast" tanks, creating fluctuating loads that impair vehicle control.

A typical dynamic buoyancy system expends pressurized gas every time it executes a full cycle of decreased and increased buoyancy. This limits the number of buoyancy adjustments the vehicle may make, requiring it to periodically cease productive operations and recharge the system from some source. A vehicle utilizing buoyancy as a sole source of depth control expends gas constantly as a result of the instability described above.

A dynamic buoyancy system may instead use pumps to reversibly transfer air between buoyancy and storage chambers. Such a system expends much less air at the cost of added weight, complexity, and noise.

The various disadvantages of contemporary buoyancy control systems may especially impact underwater robotic craft. Since these vehicles are often utilized and valued for the ability to perform dives of long duration, dynamic buoyancy systems that require frequent recharging are not desirable. Since these vehicles are typically smaller than manned submarines and submersibles, they are more sensitive to the size and weight of the complex handling equipment required to not expend buoyant material. Greater volume and weight make a vehicle less manageable and less propulsively efficient. Unmanned or robotic craft may also require a buoyancy system insensitive to extreme attitudes and accelerations.

SUMMARY OF THE INVENTION

The present invention addresses the above and other disadvantages of prior apparatus and methods for buoyancy compensation.

The present invention is generally directed to a body which in one embodiment defines a major axis and two lesser axes where said body also defines a closed cylinder which is comprised of a shape memory material which, at a particular physical state, preferentially deforms its shape to one of reduced displacement volume. Though not a prerequisite for operation, the presence of any external pressure on the closed cylinder will assist this deformation and change of state. At a second physical state the body is compelled to adopt its original, undistorted shape, thereby enhancing its volumetric displacement and hence its buoyancy. During this process it may act against external pressure up to some particular limit.

Control of the physical states of one or a number of these bodies, collectively or selectively, may be used to carefully modulate their net buoyancy. In the preferred embodiment, the material state is modulated by an application of electrical current or voltage.

It is contemplated that the present invention be used in conjunction with any manner of submersible craft. In this connection, the simple mechanics of the design allow near infinite scaling for use with full-size craft to microscopic robots. It is further contemplated that the buoyancy system of the present invention incorporates only one type of moving part of simple design and thus facilitates reliability, maintenance, and inspection. It is further contemplated that the buoyancy system of the present invention may use a number of bodies in bundle fashion such that the loss of integrity of one or more system components is not ultimately detrimental to the overall buoyancy of the craft to which they are coupled.

The present invention realizes a number of advantages over prior art buoyancy systems. One such advantage is the use of only one type of moving part and the lack of intimate movement against any other part. In such a fashion, the need for periodic inspection and maintenance is minimized.

A second advantage is the insensitivity of the invention to vehicle attitude afforded by a comparably rigid gas-to-liquid interface.

Yet another advantage presented by the instant invention is the difficulty of detecting its operation. The sealed pressure vessel design of each body component releases no material in operation such as gases, bubbles, weights, or non-ambient liquids. Further, the lack of moving parts in intimate contact, the nearly silent nature of the shape memory phase changes, and the noted acoustic damping ability of some shape memory materials permit little acoustic evidence of its operation.

Yet another advantage presented by the instant invention is the lack of need for dynamic or removable seals, air and water handling systems valves or pumps.

Still another advantage is that no supply of compressed gas is required, outside of whatever gas is permanently sealed within each buoyance component.

Still another advantages of the present invention will become apparent in light of the following illustrations and the accompanying detailed description.

DETAILED DESCRIPTION OF THE PREFERRED EMBODIMENT

The present invention may be generally described as a system for selectively modifying the buoyancy of a submersible body with which it may be associated.

A. Theoretical Basis

When a fluid medium is excluded from a sealable body, the body maintains a certain buoyancy when submerged in that medium. The net amount of buoyancy demonstrated by the body is determined as the difference between body weight and the weight of the excluded fluid. It has been found that when the body is manufactured from a material which demonstrates a memory of one or more shape states, the displaced volume of the resulting system may be modified to vary its buoyancy when submerged in a fluid medium.

A number of metallic alloys exhibit shape memory behavior, the two states corresponding to two different crystalline phases. These alloys possess a distinct temperature at which the stronger of their two memory phases—austenite—begins to form, which transformation is completed at a slightly higher temperature. They also possess a distinct, lower temperature at which the softer phase—martensite—begins to form, which transformation is completed at a yet slightly lower temperature. The particular temperatures of transformation are dependent on alloy composition and range from cryogenic, to room temperature, to a couple hundred degrees centigrade. A particular alloy for this device is selected so that all of its transformation temperatures are in excess of the expected temperatures of the medium, e.g. sea water, in which it is designed to operate. In such case cooling the device to the lower temperature requires only the natural cooling of the surrounding sea water.

The transformation from a deformed, low volume shape in the soft martensite phase to an expanded volume in the strong austenite phase is effected by supplying heat to the shape memory alloy bodies. The amount of heat energy must be sufficient to raise the alloy to the austenite completion temperature, plus account for the phase-change energy of the alloy material present, the work involved in expanding the volume against a particular maximum of external pressures, and the various thermodynamic inefficiencies. The heat may be supplied by ohmic resistance to electric current made to flow through the alloy.

Such transformation from any deformed cold shape to the original, stable, hot shape is termed the one-way shape memory effect. The maximum extent of difference between cold and hot shape is set by the recoverable strain limit for that material, $\Gamma_r$. If movement to the stable hot shape is prevented, the material will build a reaction stress up to the limit of the constrained recovery strength of that alloy, $S_r$. Within the region of memory strain, recovery strength and deformation stress remain nominally constant and do not increase with strain as do strictly elastic materials. Such a characteristic is termed pseudo-plasticity. As a result, the recoverable memory strain energy per unit volume of a fully strained element may be expressed roughly as $\Gamma'''_r \cdot S_r$ rather than $\frac{1}{2}\Gamma'''_r \cdot S_r$. Many repetitions of memory cycles will cause the shape to slip so that the recoverable strain will decrease from that maximum limit.

When heat flow to the body is insufficient to maintain the aforementioned energy sum, the crystal structure shifts to that of martensite. Any external pressure strong enough will act to deform the body to occupy less volume, and thus impart a lower buoyancy to the vehicle.

In addition, the alloy may be "trained" to exhibit a two-way shape memory effect so that a specified low volume shape is spontaneously assumed on sufficient cooling even in the absence of external pressures. Typically, the alloy is thermally cycled while mechanically constrained to the desired "memorized" cold shape. This instills a preference among the martensite crystal domains for alignment along a particular vector. Deformation occurs so much more readily along the preferred vectors that the alloy will spontaneously assume the shape associated with those vectors on sufficient cooling, provided a lack of opposing forces.

In effect, the alloy acquires a second, quasi-stable state. However, this cold shape-change is capable of exerting very little force, and movement achieved is at most half that of the one-way effect.

EXAMPLE 1

Overview

Figure 1:
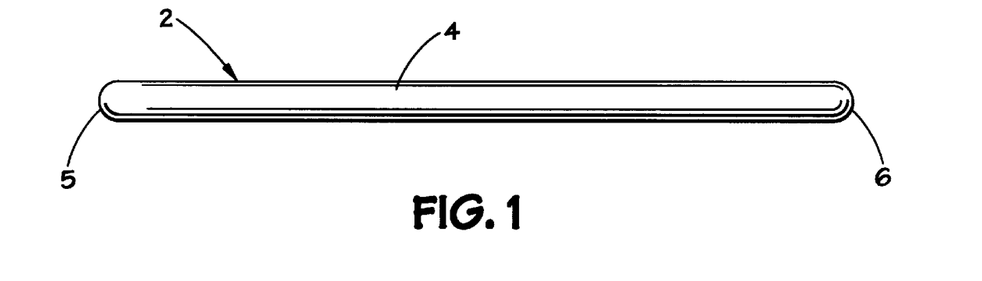
FIG. 1 illustrates a schematical view of a demonstrative embodiment of the buoyancy system of the present invention.
Figure 2A:
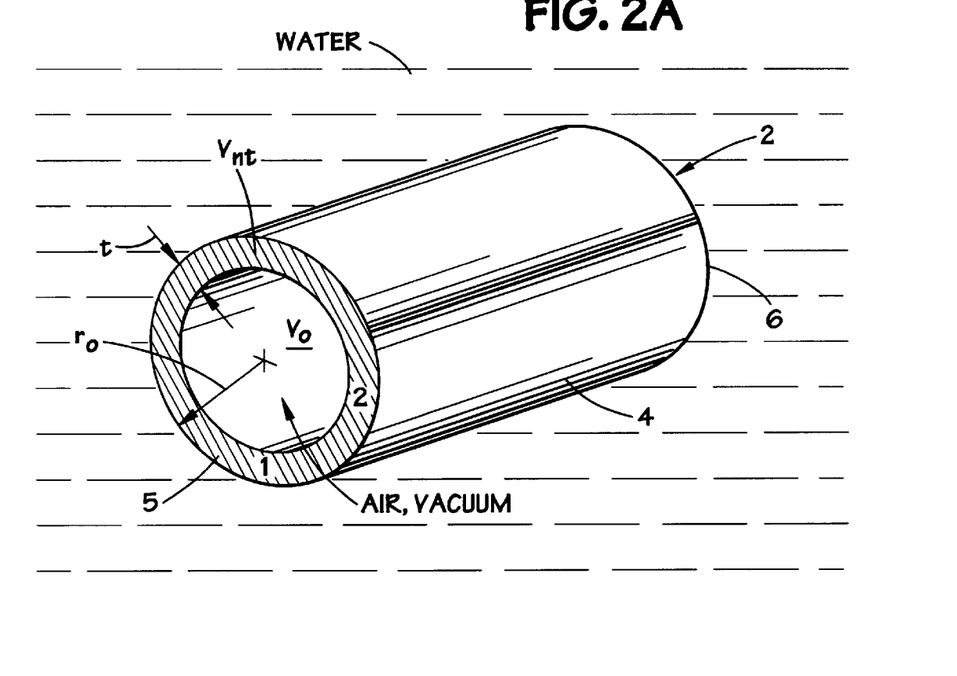
FIGS. 2A–B illustrate a perspective, sectional view of a demonstrative embodiment of the buoyancy system of the present invention in an undeformed and deformed phase.
Figure 2B:
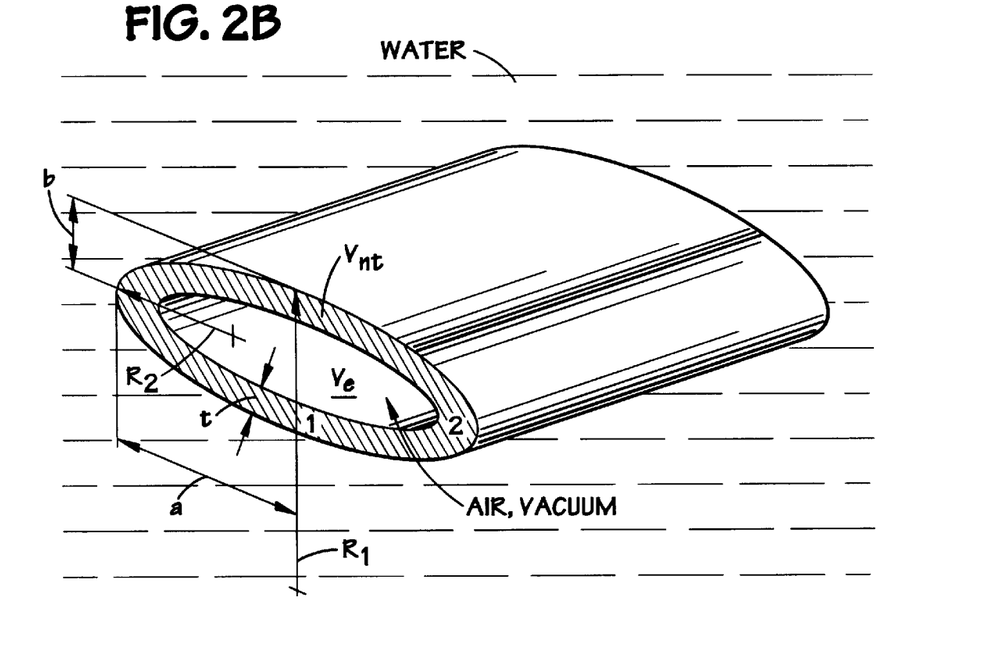

The following discussion will contemplate the use of a shape memory alloy to form a cylindrical body 2 having closed ends 5 and 6 and defining an internal cavity 4 (See FIGS. 1 and 2). In this example, body 2 is adapted to deform about its shorter two axes to form an ellipse cross-section when disposed in the "cold" phase. The ellipse was selected to increase the efficiency of the cooling shape change, since it mimics the natural mode of collapse to an oval (two lobes) of an externally pressured tube. Other natural modes result in cross-sections with three or more lobes.

The selected memory alloy is a nickel titanium, which has a maximum recoverable strain $\Gamma_{rmax}$ of 7.5%, a high constrained recovery strength $S_r$ of 172 to 688 Mpa, and a very good corrosion resistance. For 1000 memory cycles, nickel titanium can be expected to recall a recovery strain $\Gamma_r$ of 4% within the two-way memory effect. The body 2 is immersed in a fluid medium of sea water. For oceanic applications the transformation temperatures must be above 30° C. in tropical surface waters and as low as 3° when operating at great depths. Alloys with lower transition temperatures have higher recovery stresses. FIGS. 3–6 illustrating the characteristics of this device are based upon the aforementioned recoverable 4% strain, and recovery strengths of 240 MPa, 334 MPa for regular nickel-titanium SMA matching the oceanic temperatures., plus the maximum strength of 688 MPa for carefully micro alloyed and heat-treated SMA.

There are three basic elements to estimating the performance of the device and the selection of proper tube characteristics. The first is how much deformation the tube may be trained to adopt, the second is that the shape recovery cannot require more than the available recovery strength $S_r$ at critical points of the tube cross-section, and the third is that the work of displacing the fluid medium does not exceed the total available strain energy in the tube. The latter two criterion establish the relationship between operating depth and tube characteristics. They represent only two of several appropriate estimating techniques.

EXAMPLE 1

Displacement Calculations

How radically the ellipse may be trained to deform along two axes is a function of the maximum recoverable strain $\Gamma_r$. It also depends on the ratio between the body's 2 wall thickness and diameter. This is expressed mathematically as the single variable $t_{ro}$ for the ratio between tube wall thickness t and cylinder radius $r_0$. The calculation is accomplished by juxtaposing relationships from three sources: the volume change, the relationship between bending strain and radius of curvature, and the mathematical properties of ellipses. Through this deformation calculation, it can be seen that the change in buoyancy is dependant on the ratio $t_{ro}$.

The displacement is the difference between the enclosed volumes of the two cylindrical shapes, illustrated in FIG. 2.

$$\Delta v_{sw} = V_O - V_c = L \cdot \pi \cdot r_0^2 - L \cdot \pi \cdot a \cdot b$$

The key kinematic expression is the ratio of displacement $\Delta V_{SW}$ to alloy volume $V_{nt}$:

$$\frac{V_{nt}}{\Delta V_{sw}} = \frac{(2 - t_{ro}) \cdot t_{ro}}{(1 - b_{ro}^2 \cdot a_b)}$$

where $a_b$ is the ratio of the ellipse axes, $b_{ro}$ is the ratio of the short ellipse axis b to the undeformed radius $r_o$ (see FIG. 2).

The "slenderness" ratio $a_b$ will be constrained by allowing no section of body 2 to exceed the recovery strain limit $\Gamma_r$. The deformation ratio $b_{ro}$ is established by the fact that the elliptical and circular shapes must have the same perimeter. In practice, therefore, it is easier to determine thickness ratio $t_{r0}$ and deformation $b_{r0}$ from a given slenderness $a_b$, than the inverse. In this example, sectors 1' and 2' (see FIG. 2B) are the most deformed; basic geometric relations tie the strain deformation at these locations to the cylinder's ellipticity and ratios $t_{r0}$, $a_b$ and $b_{r0}$. The resulting relationship is:

$$t_{r0} = \Gamma_r \cdot \frac{\left(a_b^3 \cdot \left(\frac{1+\Gamma_r}{1-\Gamma_r}\right) \cdot \frac{1}{(0.5+e)} + \frac{1}{(0.5-e)}\right)}{\left(a_b^3 \cdot \left(\frac{1+\Gamma_r}{1-\Gamma_r}\right) - 1\right)}$$

where e is the distance between the neutral axis and centroid, expressed as a fraction of the wall thickness.

The variable buoyancy obtained per mass of shape memory alloy is:

$$\frac{\Delta Buoy}{w_{nt}} = \left(\frac{\Delta V_{SW}}{V_{nt}}\right) \cdot \left(\frac{\rho_{sw}}{\rho_{nt}}\right)$$

where $\rho_{sw}$ and $\rho_{nt}$ are the densities of sea water and the nickel titanium SMA (6.45 kg/liter), respectively.

For a vehicle to achieve neutral buoyancy, it must displace an amount of water equal to the vehicle weight. Therefore, an important factor to the design of the subsea vehicles is the volume of water that equals the weight of a particular candidate subsystem. This factor will be termed "neutral volume" for the purposes of this application. If the vehicle (or subsystem) displacement is insufficient, additional flotation volume of some combination of static or dynamic nature must be added. But any additional volume makes the vehicle less manageable and less propulsively efficient. The variable buoyancy obtained per volume of a neutrally-buoyant system is then expressed:

$$\frac{\Delta Buoy}{W_{nt}} = g \cdot \frac{\rho_{sw}^2}{\rho_{nt}} \left(\frac{\Delta V_{SW}}{V_{nt}}\right) = g \cdot \frac{\rho_{sw}^2}{\rho_{nt}} \cdot \left(\frac{[1 - (b_{ro})^2 \cdot a_b]}{(2 - t_{ro}) \cdot t_{ro}}\right)$$

where g is gravitational acceleration.

Figure 3:
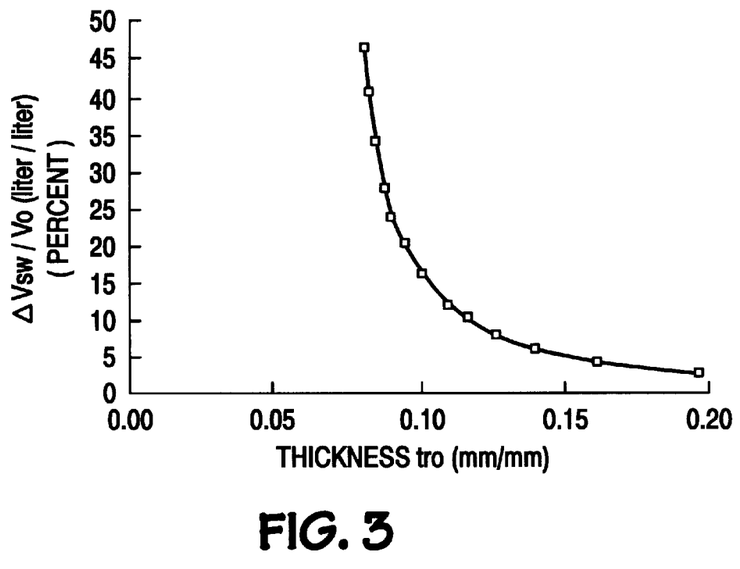
FIG. 3 graphically represents the extent to which nickel-titanium cylinders of varying wall thickness can be made to deform without exceeding a recoverable memory strain limit.
Figure 4:
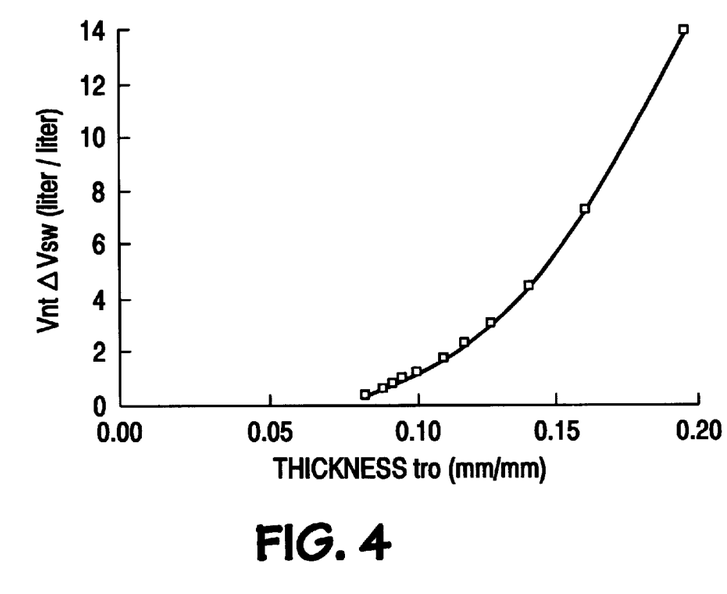
FIG. 4 graphically illustrates the quantity of a shape memory alloy used to alter displacement.

FIG. 3 illustrates the amount to which nickel-titanium cylindrical bodies of various wall thickness ratio $t_{r0}$ can be made to spontaneously deform via the two-way shape memory effect. A 4% deformation strain allows a change in the volume of between four and forty-six percent for thickness ratios of 0.2 to 0.08. FIG. 4 plots the key kinematic parameter $V_{nt}/\Delta V_{SW}$ illustrating how much shaped memory alloy is used to alter displacement, contingent on thickness ratio and recoverable stress.

Figure 5:
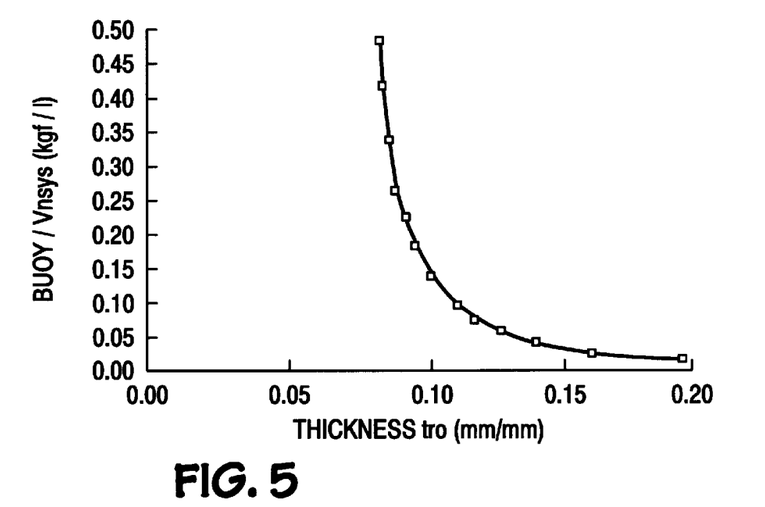
FIG. 5 graphically illustrates the buoyancy of the system per total system volume.

FIG. 5 corrects the data of FIG. 4 to express the amount of dynamic variable buoyant force obtained per liter of system neutral volume dedicated to such purpose, or buoyancy density. This volume $V_{sysn}$ includes that of the shape memory metal and sufficient static (and weightless) buoyancy to float it. The dynamic buoyance and volume created by the expansion or deformation of the tubes is in addition to this baseline. These figures for system neutral volume do not include control boxes, support structure, electrical connections, or power supplies. Though significant, such equipment is often held in common with other systems and is very dependent on overall vehicle design.

The shape memory alloy buoyancy allows for low static system displacement ($V_{sysn}$) given the amount of dynamically variable buoyancy which it can repeatedly generate. As identified previously, this buoyance regulator may be tailored to any size or mission requirements.

EXAMPLE 1

Depth Calculations

Figure 7:
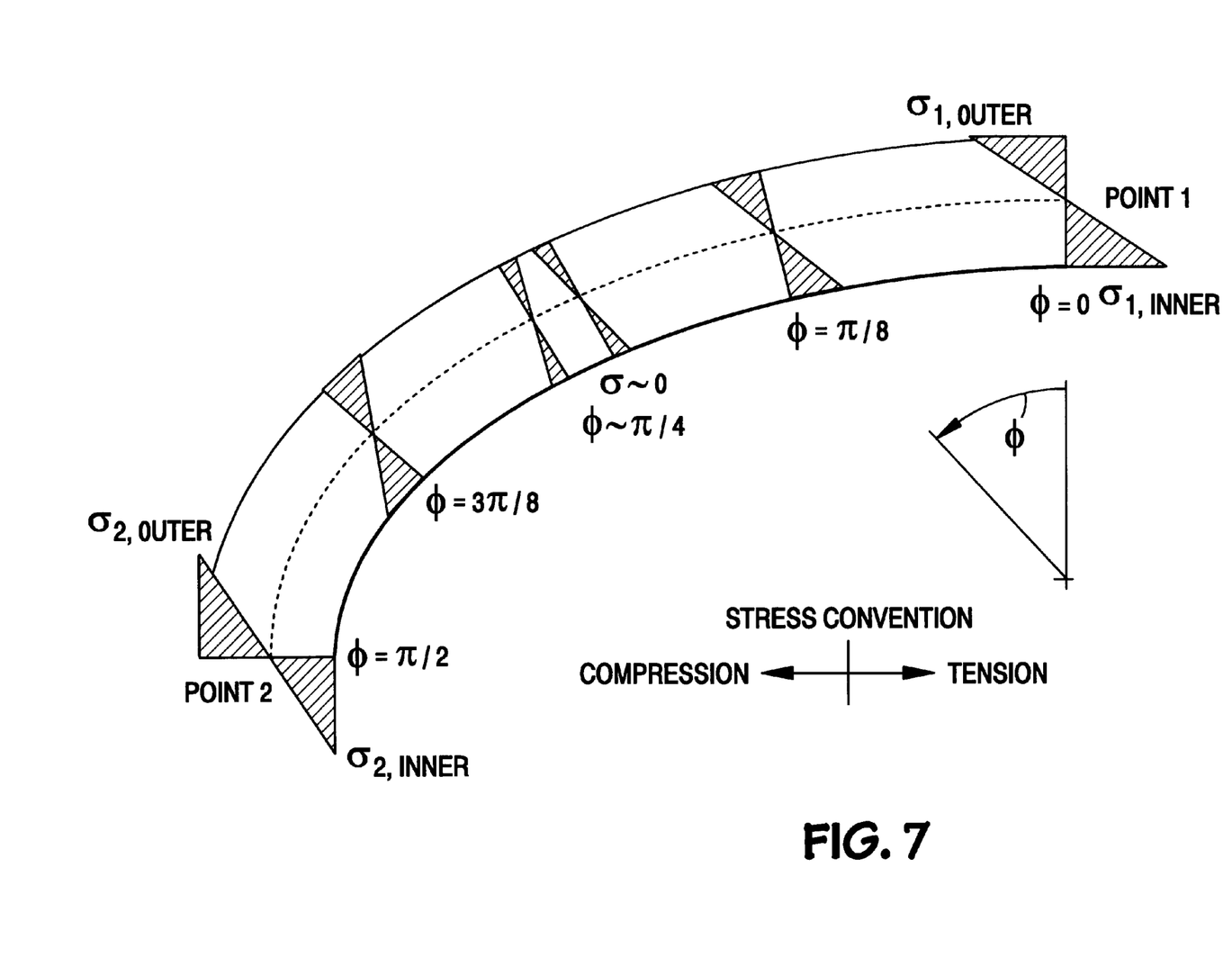
FIG. 7 graphically illustrates the geometry of a quarter-section of cylinder wall.

Hydrostatic pressure at depth causes bending moments and stresses non-circular cylinder sections which act to decrease volume (See FIG. 7). Bending stress and sin are distributed through the thickness of the cylinder walls in the roughly triangular profile typical of bending. The profile is widest with largest stresses at sectors 1' and 2' (see FIG. 2B); these are the critical points. Since the bending stresses at sectors 1' and 2' are of opposite signs, approximately halfway between sectors 1 and 2 the bending stress must reduce to zero. The difference in hoop stress between circular and elliptic sectors, being tension at sector 1 and compression at point 2, will act against the bending stress on the outer surface and will add to the bending stress on the inner surface.

The calculation first uses a formula for the bending moment existing in the walls of an elliptic cylindrical body subjected to external pressure. The resulting bending moment must then be used in a second formula to calculate an estimate of bending stress. The curved beam formula is selected for this example. The expressions for bending hoop stress are added and expressed as functions of wall thickness ratio $t_{rO}$. If this stress from hydrostatic pressure applied to the cylindrical body when maximally deformed is less than the constrained recovery strength available to the austenite phase transformation, then the shape memory alloy will overcome the external pressure to fully recover the cylindrical shape illustrated in FIG. 2A.

Since a simple relation exists between depth undersea and hydrostatic pressure, the stress equations are readily inverted to express a maximum permissible depth of shape change operation dependent on wall thickness ratio $t_{rO}$.

Alternatively, one may view the work energy of displacing the fluid volume on returning to the larger austenite shape, and see that it matches the available recoverable strain in the deformed cylinder. Such a calculation considers the net effect of all the strained metal in the cylinder rather than only that at the critical sectors 1 and 2 (see FIG. 2b). Hoop stresses must be added to the bending stress profiles from sector 1 to sector 2 (see FIG. 7). The profiles will remain triangular unless the relative hoop stress exceeds the bending stress in magnitude, which later examination of the calculated values shows not to be the case.

To estimate the strain energy represented by these profiles, a linear function is the simplest fit for running from the maximum positive to the maximum negative strains depicted at sectors 1 and 2. Meanwhile, the conflicting contributions of hoop stress difference between the inner half of the tube wall, sector 1 and sector 2, will net nearly zero. With triangular profiles and a linear positive to negative fit, a conservative first-order approximation of the integral of the product of recoverable stress and strain energy over the ellipse sections is $\frac{1}{4} \cdot \Gamma_r \cdot S_r$. Restated, the available strain energy averages to ¼ of the energy if all the material were fully strained.

Since a simple relation exists between depth undersea and displacing fluid at that pressure, the energy equation is readily inverted to express a maximum permissible depth of shape change to operation dependent on wall thickness ratio $t_{rO}$. This yields:

$$depth = \frac{1}{4} \cdot \frac{S_r}{g} \cdot \frac{\Gamma_r}{\rho_{sw}} \cdot \left(\frac{V_{nt}}{\Delta V_{SW}}\right) = \frac{1}{4} \cdot \frac{S_r}{g} \cdot \frac{\Gamma_r}{\rho_{sw}} \cdot \frac{(2-t_{ro}) \cdot t_{ro}}{[1-b_{ro})^2 \cdot a_b]}$$

where g is the gravitational acceleration and $\rho_{sw}$, is sea water density.

This depth must be compared with the depths obtained by the criterion of recovery strength at the critical points, for cylinders of the same wall thickness ratio $t_{rO}$. Recall that the geometric ratios $b_{ro}$ and $a_b$ are also complex functions of $t_{rO}$ and vice versa In this case, the strain energy criterion proves the more conservative.

Figure 6:
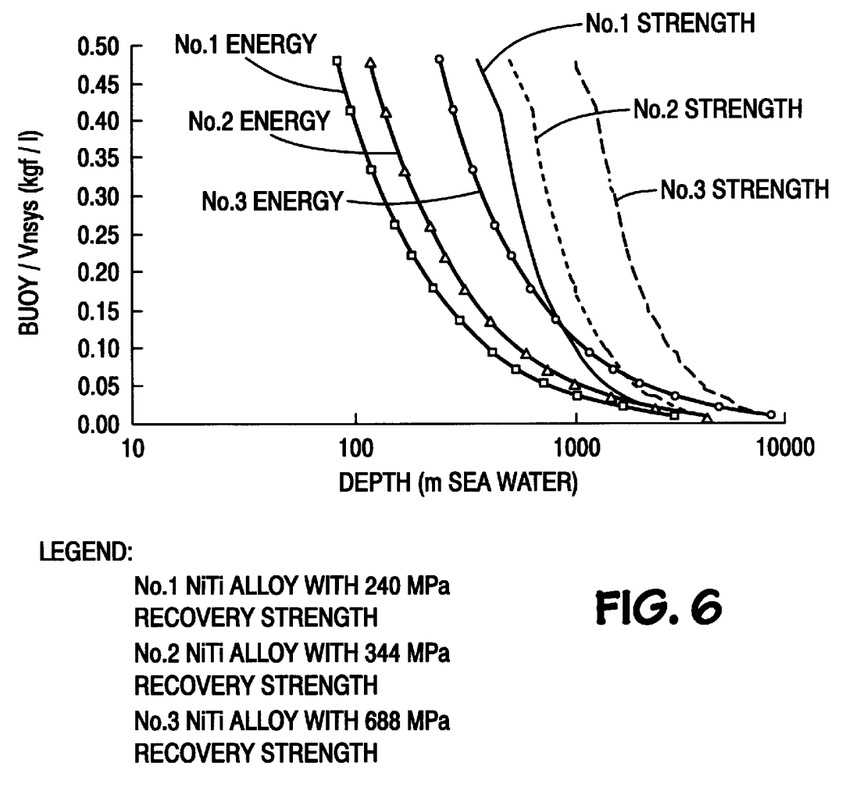
FIG. 6 graphically illustrates buoyancy changes available at various depth for different alloy strengths.

The variable buoyancy density ratio $\Delta Buoy/V_{sysn}$ may also be plotted with respect to a series of wall thickness ratios $t_{rO}$ (or $a_b$). Combining the depth and buoyancy data series, one may plot buoyancy density (kilograms buoyant force per liter at neutral buoyancy) as a function of designrated depth. FIG. 6 illustrates this final system performance information and plots the buoyancy change available at various depths for the three selected alloy strengths. It also shows how the energy criterion proved more restrictive than the strength criterion at all but the greatest depths.

The selected nickel-titanium alloys can generate at least 0.1 kgf per neutral buoyant liter at depths of 500 meters sea water (50 atmospheres). In addition, the change in volume ranges from 15% to 45% for cylinders with walls any thinner that ½0th of the cylinder diameter ($t_{ro} \leq 0.1$). Buoyancy then ranges from 0.1 kgf per kg alloy to 0.45 kgf per kg alloy. Buoyancy force density is very high also, 0.1 to 0.45 kgf/l sea water. Since the tubes by themselves (without auxiliary neutralizing flotation) have a net density greater than water, the effect is analogous to transforming ballast weight material from steel to aluminum. Further considerations of vessel packing volume, the volume of the ballast power supply, the density of the compensating flotation material, and other effects would later yield the true buoyance density of the whole system.

Furthermore, miniaturization is facilitated to the extent of readily available cylinders as small as 0.35 mm outside diameter, with even smaller sizes possible.

B. Operative Elements

The buoyancy system of the present invention is adapted for use singularly or in an array as coupled to a submersible vehicle. In this connection, the system of the present invention has application to all manner of submersible craft as an aid to buoyancy control. The system has particular application to vehicles which are required to work with varying overall weights. Such variance comes from different mission requirements, shifts in payload or robotic tooling, or operation in waters of varying densities.

The system for the present invention has particular application to robotic submersibles which require submerged mission profiles of generally long duration. Conventional applications would normally require either a complex scavenging pumping system or a considerable reserve of expandable pressurized air. The system of the present invention substantially eliminates these requirements, requiring only the presence of an electrical power source.

Figure 8:
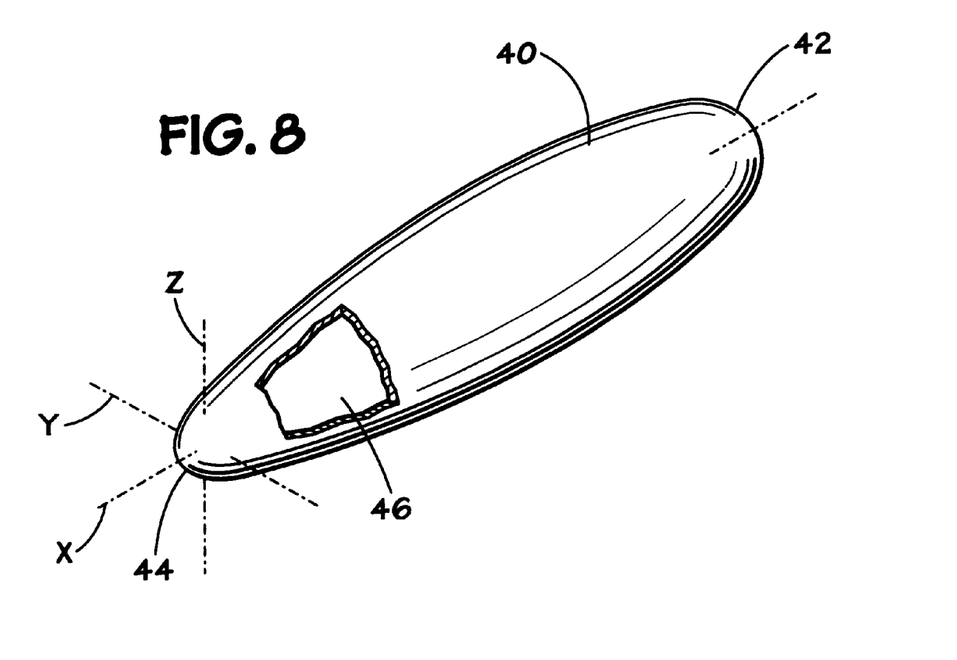
FIG. 8 illustrates a perspective partially customary view of the application of one embodiment to a submersible vehicle.

One preferred embodiment of a system of the present invention may be seen by reference to FIG. 8, in which is illustrated an elongate, cylindrical body 40 with two sealed ends 42 and 44, the resulting sealed system defining a hollow cavity 46 to enclose a readily compressible volume of air or a vacuum. In a preferred embodiment, body 40 is comprised of a nickel-titanium shape memory alloy.

Body 40 defines a major longitudinal axis "x" and two lateral axis "y" and "z", as illustrated. Body 40 should be deformable about at least one of said axis, and preferably two such axis, so as to allow the enclosed volume to be selectively modified.

The body 40 illustrated in FIG. 8 is disposed in a "heated", austenitic phase in which said body 40 maintains a cylindrical cross section maintaining a maximum volume (displacing water), and is therefore relatively buoyant. Heat may be applied to body through a variety of conventional means. It is contemplated that heat may be applied via electrical current introduced into the walls of body 40 via conventional electrical connections. (See FIG. 10)

When body 40 is allowed to cool, e.g. by the reduction or elimination of the aforereferenced electrical current, the SMA comprising the walls of said body move into the softer, martensitic phase. (See FIG. 2). In this phase, body 40 flattens to an elliptical cross section deforming axes y and z. As thus deformed, body 40 displaces less sea water and is therefore less buoyant. It is contemplated that the controlled deformation of body 40 would begin at ends 42 and 44 and propagate toward the center until substantially, symmetrical deformation is achieved.

Modulation of the amount of deformation experienced by body 40 may be achieved by ramping electrical current. It is contemplated that in operation the system of the present invention may require large amounts of power. In this connection, an elevated temperature must be maintained to produce the buoyant non-deformed shape. This heat energy is at least equal to that mechanical energy required to displace an equivalent volume of water at that depth and pressure. Reduction in power causes an immediate reduction in buoyant force. When used in an array, current may be individually and differentially supplied to each body comprising said array.

Figure 10:
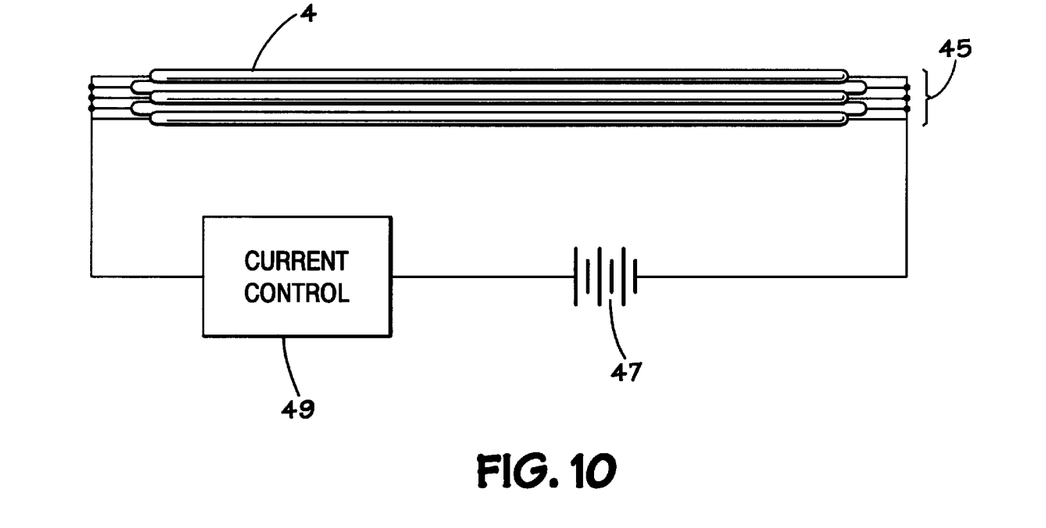
FIG. 10 illustrates a schematical view of one embodiment of the invention as it may be coupled to an electrical power source.

FIG. 10 illustrates how buoyancy cylinders might be used in an array 45 coupled to a source of electrical current 47. The amount of current to each body could be modulated through a manual or computerized controller.

While a cylindrical shape with variably elliptic/round cross-sections has been illustrated, other geometries for a buoyancy system are also contemplated within the sprit of the invention. The cold shape transformation may be made with more than the two lobes that describe an ellipse. In this respect, a round cylinder may be made to controllably collapse to a cylinder trefoil (3 lobes), tetrafoil (four lobes), or n lobes cross-section. Such different cross-sections may utilize different amounts of the available memory strain and have shorter moment arms generating the pressure-induced bending stresses.

Figure 9:
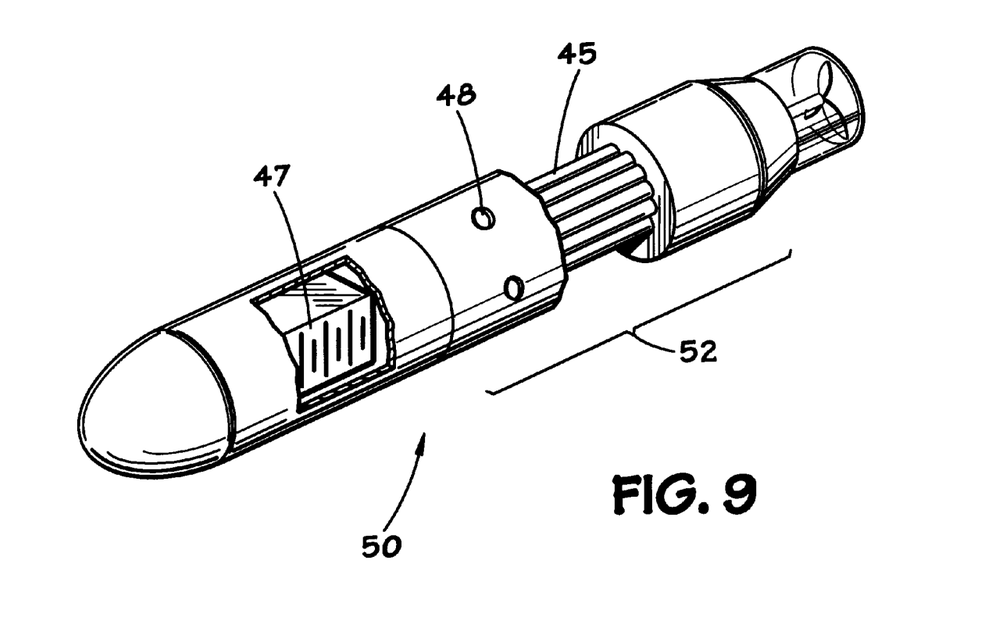
FIG. 9 illustrates a perspective view of a preferred embodiment of the invention.

The shape memory is preferably used to controllably alternate a tube between high-area and low-area cross-sections. One example contemplated is a tube where the cold shape cross-section profile is twisted down its length, the loci of the extreme points of the lobes describing helices. An exemplary application of an array 45 of the present invention may be seen by reference to FIG. 9. FIG. 9 illustrates a submersible robotic vehicle 50 including a buoyancy pod or section 52 receivable to an array of buoyancy bodies 45 as previously described in association with FIG. 8. Said array is exposed to the marine environment through apertures or vents 48 disposed in said pod 52 and such that bodies 45 be deformed upon exposure to lower temperatures and hydrostatic pressure. Array is electrically coupled to a source of electrical current, e.g. a battery 47, to induce a selective return to a non-deformed shape to enhance buoyancy.

Other configurations of the buoyancy body are also contemplated with the spirit of the invention. It is contemplated that the body 40 may be made controllably deformable upon all three axes. The shapes resulting from such realignments may include pillows, spheres, near-spheres, cones, pyramids and polyhedrons. It is also contemplated that the longitudinal axis of the general body may be bent or more or less extent about the other two axes. The shapes resulting from such realignment include various crescents, spirals and toroids.

It is further contemplated that the internal cavity 46 (see FIG. 8) may be filled with a compressible fluid. The compressible fluid will apply an internal pressure that may be used to act against some portion of external hydrostatic forces in excess of the shape memory force. This embodiment, though not expanding the span of depths in which the device operates, can offset that span to much greater depths than a buoyancy body with a vacant cavity.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

What is claimed is:

1. A buoyancy system comprising:
    a housing including walls defining an interior, sealable cavity having a certain, original volume when said walls are maintained at or above a preselected temperature,
    said walls deformable about at least one axis of orientation at temperatures below said preselected temperature to define a volume less than said original volume;
    said housing returnable to said original volume when the temperature of said walls is raised above said preselected temperature.

2. The system of claim 1 where the temperature of said walls is modulated by the application of energy.

3. The system of claim 1 where said housing describes a closed cylinder which deforms upon the application of hydrostatic pressure to define at least two lobes.

4. The system of claim 1 where said walls are comprised of a temperature sensitive nickel titanium alloy.

5. The system of claim 3 where said body at temperatures above said pre-selected temperature defines a cylindrical cross-section and at temperatures below said preselected temperature defines an elliptic cross section.

6. The system of claim 1 where the cavity contains a compressible fluid.

7. The system of claim 1 where deformation of said walls occurs spontaneously upon cooling to temperatures below said preselected temperature.

8. The system of claim 1 where the housing describes a closed cylinder which deforms to define a non-circular cross section.

9. A system adapted to be coupled to a submersible vehicle so as to selectively modify the buoyancy of said vehicle, comprising:
    a body defining walls and a compressible interior cavity fluid, said walls comprised of a temperature sensitive material deformable between a rigid first and a deformed second configuration, where the cavity in said first configuration displaces a greater volume than the cavity at said second configuration;
    where said body adapts said rigid, first configuration above a set temperature and said deformed, second configuration at temperatures below said set temperature.

10. The system of claim 9 where said body is made from a shape memory material.

11. The system of claim 10 where said material is made from a nickel-titanium alloy.

12. The system of claim 9 where the body defines a cylinder closed at each end, where the walls of said cylinder are adapted to deform about their diameter.

13. The system of claim 9 where the temperature of said walls may be modulated by the selective application of energy.

14. The system of claim 13 where said energy is drawn from a group consisting of electrical current, microwave, laser, other electromagnetic energy.

15. The system of claim 9 where said body at temperatures above said set temperature defines a cylindrical cross-section and at temperatures below said set temperature defines an elliptical cross-section.

16. The system of claim 9 where said cavity includes a compressible fluid.

17. A buoyancy array comprising:

two or more bodies coupled together to form a buoyancy system where each said body includes walls defining a sealable cavity having a certain original volume when said walls are maintained above a preselected temperature;

said walls being deformable about at least one axis of orientation at temperatures below said preselected temperature to define a volume less than said original volume, each of said bodies selectively returnable to said original volume when the temperature of each of said walls is raised above a preselected temperature.

18. The array of claim 17 where each said body possesses a distinct deformation temperature.

19. The array of claim 17 where one or more bodies of the array may be selectively subject to temperatures above or below a preset temperature.

20. The array of claim 17 where the temperature of the walls of said bodies is modulated by the application of electrical current.

21. The array of claim 17 where the bodies each describe a cylindrical cross section which deforms upon the application of hydrostatic pressure.

22. The array of claim 19 where the bodies deform to define a cross-section having an elliptical cross-section.

23. The array of claim 19 where the bodies deform to define a cross-section having at least two lobes.

24. The array of claim 17 where the walls of the bodies are comprised of a shape memory material.

25. The array of claim 22 where the shape memory material includes a nickel-titanium alloy.

* * * * *